Jan. 22, 1963 M. H. CHESTER 3,074,408
URETERAL STONE EXTRACTOR AND DILATOR
Filed May 22, 1961 2 Sheets-Sheet 1
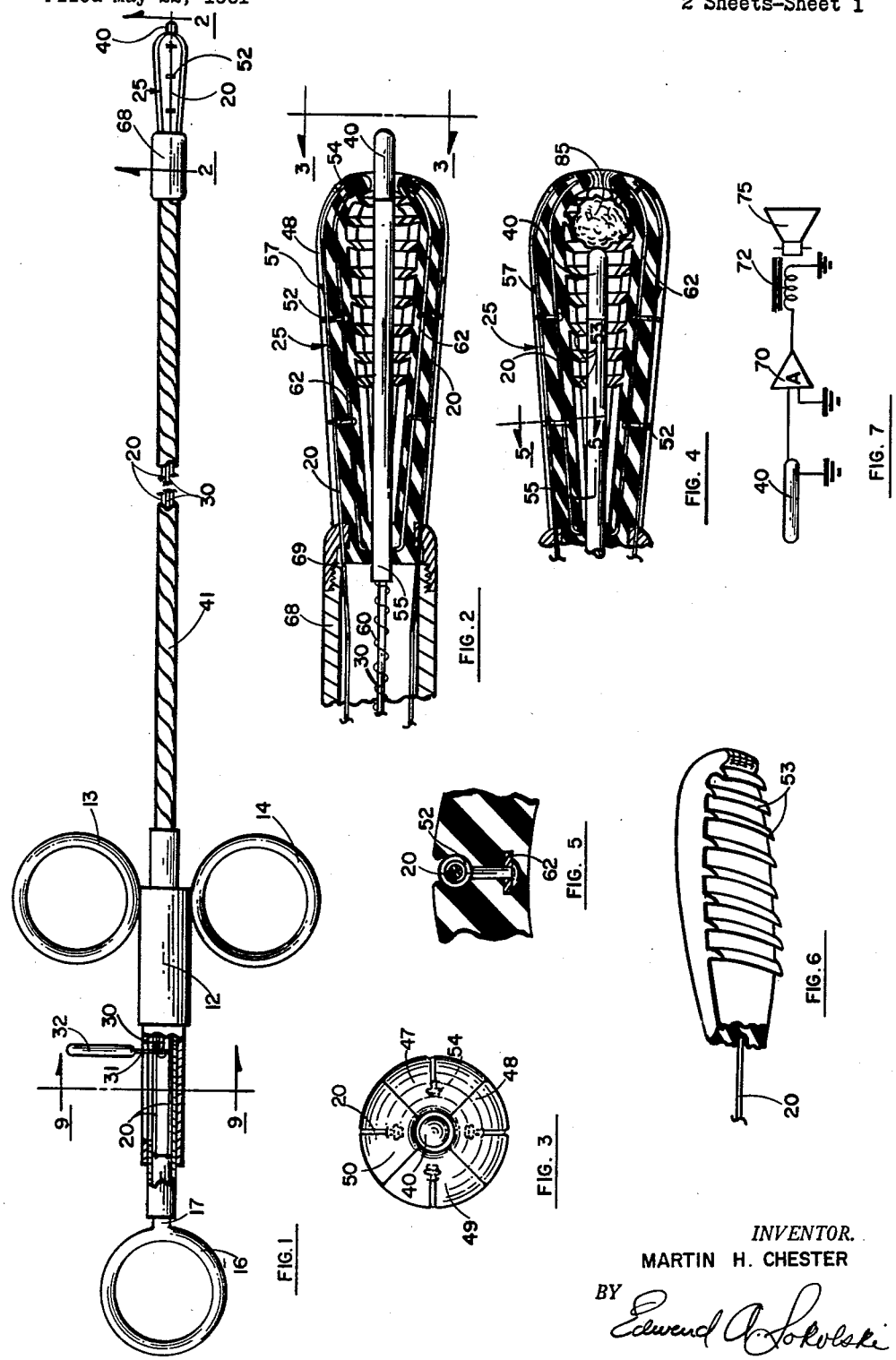
INVENTOR.
MARTIN H. CHESTER
BY
*Edward A. Sokolski*
ATTORNEY Jan. 22, 1963 M. H. CHESTER 3,074,408
URETERAL STONE EXTRACTOR AND DILATOR
Filed May 22, 1961 2 Sheets-Sheet 2

*INVENTOR.*
MARTIN H. CHESTER
BY
Edward A. Sokolski
ATTORNEY

United States Patent Office 3,074,408
Patented Jan. 22, 1963

3,074,408
URETERAL STONE EXTRACTOR AND DILATOR
Martin H. Chester, Gardena, Calif.
(335 Calle de Andalucia, Redondo Beach, Calif.)
Filed May 22, 1961, Ser. No. 111,698
7 Claims. (Cl. 128—328)

This invention relates to a ureteral stone extractor and dilator and more particularly to such a device having means incorporated therein for precisely detecting the presence and position of the stone to be extracted.

Various surgical instruments have been proposed and are now in use for the manipulation and extraction of stones form the lower ureter. These devices include baskets and loops such as the Levant, Johnson, and Davis instruments, instruments which are designed for positive grasping of the stone, such as the Calhoun forceps, and devices which are used to dilate the ureter below the stone to facilitate the passage of a small stone, such as the Dourmashkan ureteral catheter.

The use of these instruments, even in experienced hands, may give rise to complications such as rupture of the ureter, loss of parts of the instrument in the ureter, avulsion of the ureteral mucous membrane, edema and infection of the ureter. In addition, a basket with its engaged stone may become arrested in the ureter. These complications sometimes cause severe kidney damage which eventually may lead to nephrectomy.

Ureteral instruments now generally available depend on repeated X-ray examinations and the tactile sense of the operator to locate the stone. Frequently, stones are caused to migrate to the upper ureter by the passage of the basket type of instrument. In many instances, it is necessary to dilate the ureter, necessitating the introduction of dilators which increase the chances of damage to the ureter and resultant infection.

The device of this invention minimizes the above enumerated shortcomings of existing devices by providing means for precisely locating the location of the stone comprising a sound transducer. This sound transducer is slidably mounted within grasping means comprising forceps having a plurality of flexible jaws which are normally held closed by spring tension. Control cables are attached to the jaws which are controlled by the operator to open the forceps as desired. The position of the sound transducer relative to the forceps is controlled by the operator by means of a control rod. The instrument may be used to dilate the ureter as desired as well as to locate the stone and grasp it.

It is therefore an object of this invention to provide an improved ureteral stone extractor and dilator.

It is a further object of this invention to facilitate the removal of a ureteral stone and lessen the hazards incidental thereto.

It is another object of this invention to provide a ureteral stone extractor having means incorporated therein for accurately detecting the presence and location of a ureteral stone.

It is still a further object of this invention to provide a ureteral stone extractor capable of dilating the ureter, locating the exact position of the stone, and firmly grasping the stone.

Other objects of the invention will become apparent from the following description taken in connection with the accompanying drawings of which FIG. 1 is a plan view of a preferred embodiment of the device of the invention;

FIG. 2 is an enlarged cross-sectional view of the forceps and transducer portion of the embodiment of FIG. 1 as viewed along a plane indicated by the line 2—2 in FIG. 1;

FIG. 3 is an end view of the embodiment of FIG. 1 as indicated by the line 3—3 in FIG. 2;

FIG. 4 is a cross-sectional view similar to FIG. 2 showing a stone being grasped by the forceps;

FIG. 5 is a cross-sectional view taken along a plane indicated by the line 5—5 in FIG. 4;

FIG. 6 is a perspective view of one of the jaws used in the preferred embodiment of the device of the invention;

FIG. 7 is a schematic diagram illustrating how audible sounds are produced from the output of the transducer;

Figure 8A:
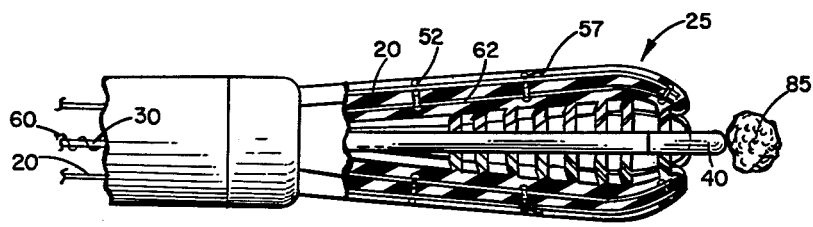
FIGS. 8a–8c illustrate how a stone is engaged in the forceps.

Referring now to FIG. 1, a plan view of a preferred embodiment of the device of the invention is illustrated. A handle portion 12 has fixedly attached thereto a pair of finger grips 13 and 14. Handle portion 12 is hollow and has slidably mounted therein a third finger grip 16 which has a shaft 17 which telescopes into handle portion 12. Attached to shaft 17 are control cables 20 which as to be explained with reference to FIGS. 2 and 3 are used to control the jaws of forceps 25. Rod 30 is slidably mounted within handle portion 12 and is fixedly attached to finger grip 32. Rod 30 is fixedly attached to sound transducer 40. Rod 30 and control cables 20 are enclosed within sheath 41. Sheath 41 must be long enough, of small enough diameter and flexible enough to pass into and assume the configuration of the ureter. Cables 20 and rod 30 must be free to slide within sheath 41.

Referring now to FIGS. 2–6, the details of the forceps and transducer of the device of the invention are illustrated. Forceps 25 comprises four jaws 47–50. These jaws are fabricated of a resilient material such as rubber. Separate cables 20 are slidably attached to each of the jaws by any convenient means such as clips 52. The end of each cable 20 is fixedly attached to the end of a respective jaw by means of a clip 54. Cables 20, as can be seen are carried in grooves formed in their associated jaws so that they are effectively isolated from contact with the ureter wall. Each of the cables 20 has a projection 57 formed therein which acts as a stop which prevents further slidable motion of the cable when it engages an eye portion formed in each of clips 52 through which the cable otherwise slides. Each of jaws 47–50 has an inner serrated wall 53 suitable for grasping the stone. Transducer 40 may be a suitably encapsulated miniature crystal pickup of the piezo electric type. Suitable pickups can be obtained from the Brush Division of the Clevite Corporation. Transducer 40 is mounted in case 55 which is fixedly attached to flexible rod 30. Insulated wire lead 60 is attached to one of the output leads (not shown) of transducer 40 while the ground return lead (not shown) of the transducer is connected to rod 30. The output of transducer 40 then can be taken between the end of wire lead 60 and rod 30. A spring steel piece 62 is imbedded in the wall of each of jaws 47–50. These spring steel pieces 62 are adapted to apply tension on the jaws to keep them closed in the absence of any drawing tension on cables 20. The jaws are attached to head member 68 by means of threaded piece 69.

Referring now to FIG. 7, a schematic diagram of means for deriving audible sounds from the transducer is illustrated. The output of sound transducer 40 is fed to amplifier 70 which may be any sound amplifier capable of high gain amplification. The output of amplifier 70 is fed to the voice coil 72 of loudspeaker 75. Transducers, amplifiers, and loudspeakers which can be used with the device of the invention are all available from commercial suppliers and the details of their fabrication and interconnection are well known in the art.

Figure 9:
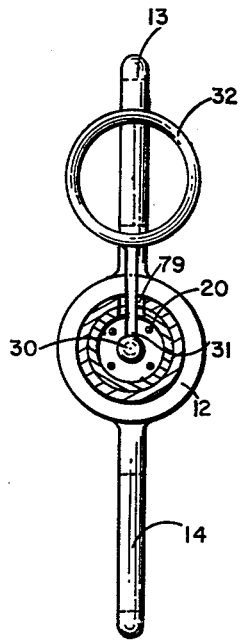
FIG. 9 is a cross-sectional view as taken along a plane as indicated by the line 9—9 in FIG. 1.

Referring now to FIG. 9, a cross-sectional view showing the finger grip control 32 for rod 30 which is used to position transducer 40 is shown. Finger grip 32 has a shaft 31 connected thereto which in turn is attached to rod 30. Shaft 31 rides in slot 79 which is formed in the top wall of handle portion 12. Finger grip 32 may be readily used to control the position of transducer 40 relative to forceps 25 along their common axis.

Figure 8B:
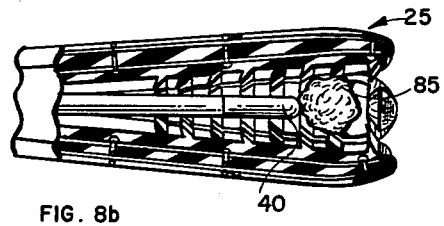
Figure 8C:
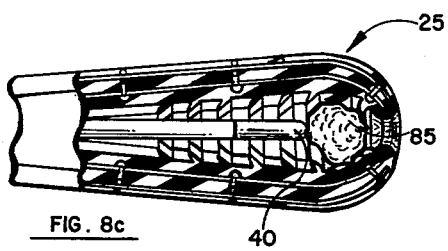

The operation of the device of the invention can be followed with reference to all of the drawings with special attention to FIGS. 8a–8c. The stone extractor is inserted into the ureteral orifice by direct vision with the use of a standard cystoscope such as the Brown-Buerger or McCarthy Pan Endoscope. The narrowed intramural ureteral orifice may be dilated or incised to facilitate the introduction of the tip of the instrument into the ureter. While the instrument is being passed up the ureter, none of the finger grips are held and the sound transducer 40 juts out ahead of the forceps 25 as indicated in FIG. 2. As the instrument is passed up the ureter, the operator should listen for a sharp click on the loudspeaker 75 which will occur when the transducer strikes against a stone. With a little practice, an operator will clearly be able to identify such contact. Should the stone migrate, the operator may follow it to the new position. There is little possibility that the stone will be by-passed or will be pushed any appreciable distance without its presence being detected by a trained operator.

When the level of the stone is determined, the sound transducer should be retracted into forceps 25 by means of finger grip 32, while the operator opens the four jaws 47–50 by retracting finger grips 13 and 14. This will dilate the ureter and allow the stone 85 to drop into the forceps 25. The commencement of this part of the operation is illustrated in FIG. 8a. As indicated in FIG. 8a, transducer 40 is in contact with stone 85 and cables 20 are being withdrawn by means of finger grip 16 with projections 57 abutting against clips 52. FIG. 8b shows the jaws 25 opened wide enough with further tension on cables 20, to permit the entrance of stone 85. Transducer 40 has been retracted by means of finger grip 32. The operator will hear the characteristic "click" when the stone is engaged in the jaws and again makes contact with the transducer. The jaws of the forceps are then closed by releasing grips 13 and 14. When the jaws of the forceps have been closed, the presence of the stone 85 can always be detected by withdrawing the transducer 40 a short distance by means of finger grip 32 and then quickly advancing it while listening for the contact click. FIG. 8c illustrates the stone 85 held in forceps 25 with transducer 40 abutting against it. As illustrated in FIGS. 8a–8c, the jaws can be effectively utilized to dilate the ureter. By means of projections 57 operating in conjunction with clips 52, the jaws are made to present a wide abutting surface against the ureter wall as they are opened, thereby distributing the dilating force over a relatively large ureter surface. This tends to minimize the chances of rupturing the ureter.

When the operator has assured himself by the above method that the stone is being held in the forceps, he should commence to carefully extract the instrument from the ureter avoiding any undue pulling of tissue. Should the stone be disengaged during the operation, it can be relocated with the sound transducer and again grasped in the jaws of the forceps as described above.

The use of four pliable jaws to comprise the forceps minimizes the possibilities of accidental tearing of the ureter by the jawed part. If a segment of the ureter should accidentally be engaged in the jaws, this could be detected by the sound transducer which will produce an identifying type sound when it is pushed into contact with the soft tissue.

If it is not possible to remove the stone with this instrument, and an operative radical surgical procedure is decided upon, then the stone may be disengaged by opening the jaws and pushing the stone back into the ureter with the sound transducer by means of finger grip 32.

The device of this invention thus provides an improved instrument which greatly facilitates the performance of a difficult operation for removing a ureteral stone.

The device of this invention may also be utilized to detect and extract small stones in a choledocholithotomy.

Although the invention has been described and illustrated in detail, it is to be clearly understood that the same is by way of illustration and example only and is not to be taken by way of limitation, the spirit and scope of this invention being limited only by the terms of the appended claims.

I claim:

1. In a ureteral stone extractor having means for grasping and holding a stone, sound transducer means surrounded by said grasping means for detecting the presence of the stone, means for slidably supporting said sound transducer means within and coaxial with said grasping means for slidable motion in the directions of the longitudinal axis of said grasping means, means connected to receive the output of said sound transducer means for producing audible output signals in accordance with said output, and means for controlling the position of said sound transducer means relative to said grasping means in the directions of said longitudinal axis.

2. A ureteral stone extractor comprising a forceps having a plurality of flexible jaws, a separate control cable connected to each of said jaws, control means attached to said cables for pulling said cables and opening said jaws, means imbedded in said jaws for urging said jaws to close, a sound transducer slidably mounted within said forceps, said sound transducer being coaxial with said forceps, means for controlling the position of said transducer relative to said forceps along the common axis of said transducer and said forceps, and amplifier means connected to receive the output of said transducer means for producing audible output signals in accordance with the output of said transducer.

3. The device as recited in claim 2 wherein said means for controlling the position of said transducer comprises a rod, one end of said rod being attached to said transducer and a finger grip attached to the other end of said rod.

4. In combination, a forceps comprising a plurality of flexible jaws, spring means attached to said jaws for urging said jaws to close; sound transducer means positioned concentric with said forceps for producing sound vibrations in accordance with the hardness of objects contacted thereby, said sound transducer means being slidably mounted relative to said forceps; means for opening said jaws; means for slidably positioning said transducer relative to said forceps; and means connected to receive the output of said transducer means for producing audible sounds in accordance with the output of said transducer.

5. The device as recited in claim 4 wherein said means for opening said jaws comprises a cable attached to each of said jaws and a finger grip attached to said cables.

6. A ureteral stone extractor comprising a hollow handle portion, a first and second finger grip fixedly attached to said handle portion, third and fourth finger grips each slidably mounted in said handle portion, a plurality of cables attached at one end to one of the slidably mounted finger grips, a rod attached at one end to the other of said slidably mounted finger grips, a sheath attached at one end to said handle portion, said sheath surrounding said cables and said rod, a head member fixedly attached to the other end of said sheath, a plurality of flexible jaws fixedly attached at one end thereof to said head member, means for urging said jaws closed, the other end of each of said cables being attached to a separate one of said jaws, a sound transducer slidably mounted relative to said jaws, said transducer being attached to the other end of said rod, and amplifier means connected to receive the output of said transducer for producing audible sounds in accordance therewith.

7. The device as recited in claim 6 wherein said means for urging said jaws closed comprises a spring steel piece imbedded in the wall of each of said jaws.

References Cited in the file of this patent
UNITED STATES PATENTS

| | | |
|---|---|---|
| 1,303,135 | Wappler | May 6, 1919 |
| 2,243,057 | Wolf | May 20, 1941 |
| 2,616,415 | Kirby et al. | Nov. 4, 1952 |
| 2,621,651 | Wallace | Dec. 16, 1952 |